US010419382B2

United States Patent
Snider et al.

(10) Patent No.: US 10,419,382 B2
(45) Date of Patent: Sep. 17, 2019

(54) PROPOSED MESSAGE DISPOSITION VIEWPORT APPARATUS AND METHOD FOR TIMED OPERATION

(71) Applicant: Notion AI, Inc., Ann Arbor, MI (US)

(72) Inventors: Lindsay Snider, Ann Arbor, MI (US); Ian Berry, Ann Arbor, MI (US); Guy Suter, Ann Arbor, MI (US)

(73) Assignee: Notion AI, Inc., Ann Arbor, MI (US)

( * ) Notice: Subject to any disclaimer, the term of this patent is extended or adjusted under 35 U.S.C. 154(b) by 133 days.

(21) Appl. No.: 15/791,880

(22) Filed: Oct. 24, 2017

(65) Prior Publication Data
US 2018/0048611 A1    Feb. 15, 2018

Related U.S. Application Data

(63) Continuation of application No. 14/637,267, filed on Mar. 3, 2015, now Pat. No. 9,825,896.

(60) Provisional application No. 61/947,894, filed on Mar. 4, 2014.

(51) Int. Cl.
  *H04L 12/58*  (2006.01)
  *G06F 15/16*  (2006.01)

(52) U.S. Cl.
  CPC ............ *H04L 51/26* (2013.01); *H04L 51/22* (2013.01); *H04L 51/24* (2013.01); *H04L 51/36* (2013.01)

(58) Field of Classification Search
  USPC ........................................................ 709/206
  See application file for complete search history.

(56) References Cited

U.S. PATENT DOCUMENTS

| | | | |
|---|---|---|---|
| 6,778,069 B1 * | 8/2004 | Katagiri | H04W 68/00 340/7.51 |
| 7,627,523 B1 | 12/2009 | Symonds et al. | |
| 7,647,042 B2 | 1/2010 | Willey | |
| 7,970,849 B2 | 6/2011 | Klassen et al. | |
| 8,185,492 B2 | 5/2012 | Mayers et al. | |
| 8,219,618 B2 | 7/2012 | Kiyohara | |
| 8,655,981 B2 | 2/2014 | Kiyohara | |
| 8,872,983 B2 | 10/2014 | Yoshida | |
| 9,241,070 B1 | 1/2016 | Pycko | |
| 9,442,621 B2 | 9/2016 | Hauser | |
| 9,825,896 B2 * | 11/2017 | Snider | H04L 51/26 |

(Continued)

*Primary Examiner* — Jude Jean Gilles
(74) *Attorney, Agent, or Firm* — Jeffrey Schox; Padowithz Alce (57) ABSTRACT

A message post-processing apparatus provides an optional instrumented viewport to a message recipient to store message dispositions such as archive, reply-to, forward, open, move, delete, and each elapsed time-to-disposal (TTD) from display. The instrumented viewport also displays a proposed disposition and a proposed TTD, which may be overridden within the instrumented viewport. A timer is initialized to TDD when each message is substantially within the viewport. Absent user intervention, a disposer circuit performs the proposed operation on the message upon expiration of the TTD. The proposed TTD and disposition is derived from analyzing the history and quality of similar messages among recipient's dispositions. When a recipient changes the treatment of a message, the apparatus stores the new disposition and TTD for future reference. A synthesizer circuit transforms message body and headers and proposed TTD and disposition into a message precis.

17 Claims, 5 Drawing Sheets

(56) References Cited

U.S. PATENT DOCUMENTS

| | | | |
|---|---|---|---|
| 2002/0128033 A1 | 9/2002 | Burgess | |
| 2004/0039630 A1* | 2/2004 | Begole | G06Q 10/10 705/320 |
| 2005/0004990 A1* | 1/2005 | Durazo | G06Q 10/107 709/206 |
| 2005/0192822 A1* | 9/2005 | Hartenstein | G06Q 10/109 705/319 |
| 2011/0231499 A1* | 9/2011 | Stovicek | H04M 1/72547 709/206 |
| 2013/0222519 A1 | 8/2013 | Lee et al. | |
| 2013/0340094 A1* | 12/2013 | Majeti | H04L 63/04 726/28 |
| 2015/0113076 A1* | 4/2015 | Dubie | H04L 51/16 709/206 |

* cited by examiner

PROPOSED MESSAGE DISPOSITION VIEWPORT APPARATUS AND METHOD FOR TIMED OPERATION

CROSS-REFERENCE TO RELATED APPLICATIONS

This application is a continuation of U.S. patent application Ser. No. 14/637,267, filed 3 Mar. 2015, which claims the benefit of U.S. Provisional Application Ser. No. 61/947,894, filed on 4 Mar. 2014 which are both incorporated by reference in their entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Technical Field

Electronic message processing and user interface devices.

Description of the Related Art

Well known electronic means for communication such as email messaging are multiplying by text, voice messaging, tweets, short message service (sms), images, photos, sounds, which result in overloading their recipients.

It is known that some integrated email systems enable a sender to indicate the sender's importance of a message, but a recipient email client may not display the indicator and in a non-hierarchical relationship, the recipient may not echo the same priority.

And if there are numerous emails in an inbox to canvas, the recipient may take notice and operate on a first email that seems urgent and fail to anticipate a second email which is even more important or which lowers the priority of the first.

It is known that various methods and apparatus are available to determine and remove messages containing malicious content or unsolicited commercial messages. And these continue to improve in coverage which reduce unsought communication.

Even so, it is often difficult to prioritize the reading and response to received email that is all legitimate. Some of the mail sent as CC to CYA may require intervention or stimulate action on the part of the recipient, while most of it is merely documentary or informational.

For the purpose of clarifying the invention within the disclosure we define certain terms: Disposition of electronic communication is defined to include archiving a message, reading and forwarding an email to another recipient, reading and replying to the sender of an email, engaging with the message, and deleting a message. Messages include other than email such as voice messages, faxes, multimedia messages, tweets, and feeds. A sound bite is a short clip of speech or music extracted from a longer piece of audio, often used to promote or exemplify the full length piece. In the context of journalism, a sound bite is characterized by a short phrase or sentence that captures the essence of what the speaker was trying to say, and is used to summarize information and entice the reader or viewer. Herein a precis (pronounced "preh-si"): is a transformation of a summary or abridgment but is a representation rather than a truncation. Herein a viewport is a virtual window presented on a display which bounds all or a portion of an array of message precis. Navigation controls cause the viewport to pan or scroll the visible portion of the array.

It is known that OAuth is an evolving framework and open standard for authorization. OAuth provides a method for clients to access server resources on behalf of a resource owner (such as a different client or an end-user). It also provides a process for an end-user to authorize third-party access to his server resource without sharing his credentials (typically, a username and password pair), using user-agent redirections.

IETF RFC 6749 discloses: an OAuth 2.0 authorization framework enables a third-party application to obtain limited access to an HTTP service, either on behalf of a resource owner by orchestrating an approval interaction between the resource owner and the HTTP service, or by allowing the third-party application to obtain access on its own behalf. This IETF specification replaces and obsoletes the OAuth to protocol described in RFC 5849.

OAuth provides an authorization layer to separate the role of the client from that of the resource owner. In OAuth, the client requests access to resources controlled by the resource owner and hosted by the resource server, and is issued a different set of credentials than those of the resource owner.

Instead of using the resource owner's credentials to access protected resources, the client obtains an access token—a string denoting a specific scope, lifetime, and other access attributes. Access tokens are issued to third-party clients by an authorization server with the approval of the resource owner. The client uses the access token to access the protected resources hosted by the resource server.

A growing number of hours per day for each email user is being lost to read and dispose of automated email messages from legitimate commercial and social relationships. Each person has their own preferences on how to handle various types of messages.

What is needed is a quicker and personalized way for a message recipient to react to and dispose of the majority of a large volume of messages which match substantially similar previously received and resolved messages.

BRIEF SUMMARY OF THE INVENTION

An apparatus provides an optional instrumented viewport to message recipients to record message operations such as archive, open, play, add to calendar, reply, or delete, in general, dispositions, and the elapsed time-to-disposition (TTD) from when the message usefully entered the instrumented viewport.

For messages that have similarities, e.g. from same sender, from similar IP addresses, similar subject text strings, or message body formats, the instrumented viewport also displays a proposed operation (disposition) and a proposed TTD, both of which may be overridden within the instrumented viewport.

A timer is launched when a message occupies the viewport long enough to be apprehended. Upon expiration of the timer, a disposer circuit performs the proposed operation on the message.

The proposed TTD and proposed disposition is derived from analyzing the history of similar messages such as recipient's most recent dispositions of messages from the same sender. Alternately, the history of sender's frequency, recency, and quantity of messages will influence a proposed TTD and disposition. Alternately, a quality of content scored by metrics of keywords determines a proposed disposition and TTD.

The invention reduces a user's effort in scanning messages. Action or inaction can be proposed as defaults from analyzing the characteristics of the message. From prior user mail handling behaviors, a circuit predicts a most likely recipient action on a message. A predicted/proposed action is displayed in the viewport along with an excerpt or representation of the message.

Continuous machine learning reduces the error rate in prediction and increases the percent of time the user views an incoming message and accepts the proposed action. A circuit receives and analyzes mail, text, voice, faxes in a method which reflects the recipient's past preferences and behaviors. The apparatus applies methods for machine learning and benefits from data patterns in individual history. A message apparatus proposes a most likely action for each message according to rules derived from a message recipient's own prior preferences. Messages are analyzed using rules and learned preferences. A recipient accepts or corrects the proposed action. When a recipient determines a different action than anticipated, the disposition is stored for future reference.

BRIEF DESCRIPTION OF THE SEVERAL VIEWS OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DISCLOSURE OF EMBODIMENTS OF THE INVENTION

One aspect of the proposed message disposition invention is a system that includes a navigator that has an instrumented viewport to display a proposed time-to-disposal (TTD) and a proposed disposition for each message; and, a transformer that has a timer for each message in the viewport which causes a disposer circuit to perform the proposed disposition when the time-to-disposal elapses after the message enters the viewport, the transformer is coupled to the navigator and also coupled to at least one of a plurality of message servers.

In an embodiment, the transformer also includes an interface circuit to retrieve a message body and headers from a message server; a disposition store of recipient's previous message dispositions and time-to-disposal (TIO); a predictor circuit to propose a most likely disposition and most likely no by closest match of a retrieved message with a similar message in disposition store using content, sender id, ip address, or domain; and, a precis synthesizer circuit to transform message body and headers and proposed TTO and disposition into a message precis.

In an embodiment, the navigator also includes a user interface to receive commands to perform message dispositions including, but not limited to, archive, delete, forward, open, play, replyto, and schedule that are recorded into disposition store and transmitted to the message server; a user interface to receive commands to amend a proposed disposition and to amend a proposed TIO; sensors to determine a time when a message entered or exited the viewport, and a time when a message was disposed; and, a navigation control to scroll or pan message precis through the viewport.

In an embodiment, the transformer also includes a disposition recorder to write no and disposition into disposition store; and an interface circuit to transmit a command to the message server to implement the disposition.

A user operates the message navigation control to display message precises, to select message precis, and to issue commands to operate on message precis. A message precis is easily distinguished from conventional message metadata by inclusion of a proposed disposition, and a proposed time to disposal (TIO). According to the message type, its precis also may have a soundbite of a voice or audio file, a thumbnail of an image, or an excerpt of a text message.

In an embodiment, the navigator provides an instrumented viewport and navigation control and reports to the transformer when the message precis enters the viewport, when the user opens a message, and when the user deletes a message. In an embodiment, the navigator provides timers for each proposed message disposition and signals the transformer when to perform a message disposition either from user activity or from timer completion.

In an embodiment, the transformer also has a command circuit to delete the message from the message server at the earlier of the expiration date and the user causing the message to be deleted.

In an embodiment the system also has a circuit that upon receiving the message metadata, determines a proposed TTD and a proposed disposition when recipient has recently disposed a similar message. In an embodiment, the system tracks frequency, recency, and quantity of messages received from a sender to determine a proposed TDD and a proposed disposition. In an embodiment, the system scores content of the messages to determine a quality of messages between a sender and a recipient.

In an embodiment, the navigator also has a circuit to display a selectable message precis, a proposed TTD, and a proposed disposition in an instrumented viewport that senses when each message enters the viewport, when the message is opened, and when the message is deleted.

In an embodiment, the transformer also has a timer that is triggered by the instrumented viewport and that causes performance of the proposed disposition when the proposed TTD matures absent intervention by the user.

In an embodiment, a precis includes a soundbite or a thumbnail reduced size lower resolution image from a video. In an embodiment, a precis includes an image of a text string excerpted from a message body.

Message precis are stored into an N-dimensional array of categories and ranks. User controls determine if these message precises are presented in a 1 dimensional list, a 2 dimensional table, or some other visualization.

A message precis navigation interface scrolls and or pans message precis into or out of a viewport. The viewport displays metadata for each message including the sender, date, subject, a proposed disposition, and some representation of the message. When a precis has been present within the viewport more than a threshold of time, a timer is started. The recipient may stop or reset the time to a shorter or longer period. Unless the recipient operates on the message precis, the proposed disposition is performed upon completion of the timer.

The message transformation and disposition apparatus (transformer) comprises an interface circuit to access at least one message server. The transformer includes a commands transmitter that sends commands to a message server such as but not limited to archive, retrieve, delete, open, play, forward, replyto, and combinations thereof. The transformer includes a plurality of timer circuits for each message precis and a timer control circuit that receives commands from the recipient display and control apparatus to start, stop, and reset any timer. A message disposition circuit implements a disposition command received from a recipient display and control apparatus or upon timer expiration performs a proposed disposition. A message disposition store records a plurality of disposition actions and times for each sender. For each received message, a disposition predictor circuit reads the most recent dispositions and times if a sender has a stored record in the disposition store and proposes a disposition and a time to execute the proposed disposition.

A categorization circuit groups messages by type, or by sender organization, or by subject matter or by message type. In an example, messages from family are grouped, messages relating to work are grouped, messages relating to finances are grouped, messages relating to hobbies or interests are grouped.

A ranking circuit sets a priority for messages within each group. Messages with a proposed disposition of deletion are of lowest priority. Messages with long time-to-disposal have lower priority than messages with shorter time-to-disposal. Messages whose proposed disposition is to forward or reply have higher priority than messages whose proposed disposition is to archive.

The message transformation and disposition apparatus transforms a plurality of messages into precis which have proposed TTD and proposed dispositions, groups, and ranks. The apparatus transforms minimal activity of the recipient into operations at the message server.

The recipient display and control apparatus has a viewport through which precis may be presented to the user. A navigator circuit determines which precis are displayed. A timer signaling circuit transmits a scoping event when a message precis has been within the viewport for a time greater than a threshold, when the message is selected or when the message is disposed. In an embodiment, the granularity of a timer may not even record that a message has been within a viewport until a substantial time has passed. A message status circuit removes message precis from the store when deleted and signals the message transformation and disposition apparatus to transmit commands to the message server. A message control circuit causes messages to be fully displayed when selected, receives and performs deletion commands, receives and executes timer reset commands, and configures the viewport to appear as a list, a table, or an other form of display. A determination that a message has been attended to within a viewport may be obtained by a video camera facing the user.

The recipient display and control apparatus transforms collection of message precis into a selectable list or table. The apparatus transforms minimum activity on the part of the user into disposition commands and stores the dispositions for future replication.

Another aspect of the invention is a system for message disposition acceleration by a recipient that includes: a message navigation and viewport control apparatus (navigator) that has an instrumented viewport to record disposition of messages and time from whence each message first entered the viewport until each message is disposed; and, a message transformation and disposition apparatus (disposer) that has a store of recipient's message dispositions and each time-to-disposition (TTD) for messages received by recipient and a store of message dispositions and TTD performed by one or more of recipient's message senders.

In an embodiment, a circuit, such as a processor coupled to a non-transitory instruction store, determines a condition of read or viewed for an electronic document (email) in an email client when the email gets scrolled past a specialized viewport screen.

In an embodiment, if the operator opens the email, the signaler circuit can time how long the email is versus how long the operator has been looking at it to estimate read percentage.

In an embodiment, a message disposition is opening a related application wherein a related application is one of the following a web browser, a phone app, a text message app, a contacts manager, a reading app, a shopping app, and a calendar app.

In other embodiments, a signaler circuit measures how long the operator left a message in his inbox, if he replied and how long he waited to reply, if he deleted it, if he opened it, if he moved it and to where, or if he ignored it. The invention then uses all of these metrics to build intelligence on how important that email is to its recipient.

From a recipient's recorded prior message handling behaviors, a circuit predicts a most likely action on another message to a user. An instrumented viewport displays a predicted/proposed action along with an excerpt of the message. When the user chooses an action different from the predicted action in response to the message, the circuit develops a pattern to better match the characteristics of the message in future predictions.

The present invention provides productivity for receiving and responding to electronic messages such as e-mail but may also apply to images, video, audio, and other sensory communications. The apparatus improves rules to apply to future received messages after observing the recipient's corrected treatment or action.

In effect the apparatus forecasts what a user will likely do in response to a message with certain characteristics. In many cases, the user will simply digest a notification, e.g. that an event succeeded as expected and subsequently archive or discard the message e.g. out of office replies, shipments shipped, payments paid, FYI informational, acknowledgements/receipts with no action required. The app shows a proposed relocation or disposition and after the recipient has had an opportunity to scan a message precis, performs the proposed action.

In a graphical visualization, a plurality of thumbnails or icons of emails is presented to a user who may move, gesture, or click on an email to correct, confirm, or accelerate the proposed action.

The message apparatus records to whom the recipient has either responded in the past or from whom the recipient has requested action in the past. The frequency, recency, and quantity of message traffic from a sender to a recipient is noted for future use. A quality of message traffic is determined by scoring content using a keyword filter. Natural language processing of these metrics provides an intent score. Communications from those people have different proposed actions if they seem to be conversational (as opposed to broadcast/informative). Messages or communications with dates have a level of urgency and may be proposed to be added to a calendar.

One aspect of the invention is a method executable by a processor to perform steps for continuously improving a user's productivity in disposing of electronic messages: accessing a message recipient's inbox at a message server; copying and storing an unread message; determining from characteristics of the message, a proposed action, and a proposed time to perform the proposed action after the user has first put the message in scope; displaying in a viewport an excerpt or representation of the message, a proposed action and a proposed time when the proposed action will be scheduled after the message is first in scope; observing when the user first places the message in scope in the viewport and starting a timer; performing the proposed action when the timer completes unless the user intervenes by performing another action or adjusting the timer; receiving a user command to reset the timer: observing the user's preferred response to the message; and improving the rule base with additional message characteristics, proposed actions, and timers.

In an embodiment, the characteristic is that the message contains the words "to unsubscribe". In an embodiment, the characteristic is that the message has a plurality of addressees. In an embodiment, the characteristic is that the message is a reply to the recipient's previously transmitted message or is in a thread of related messages.

In an embodiment, the proposed action is to initiate a chat, voice, or video connection. In an embodiment, the proposed action is to transfer the contents of the message to a calendar. In an embodiment, the proposed action is to move the message to a folder. In an embodiment, the proposed action is to archive the message. In an embodiment, the proposed action is to send an acknowledgement message. In an embodiment, the proposed action is to open a reply window.

In an embodiment, a timer is set for H hours from accessing the inbox. In an embodiment, a timer is set for M minutes from first scan of message excerpt. In an embodiment, a timer is set for D days from date of last opening of message.

In an embodiment, scope is determined by a viewport circuit which flags emails considered viewed when scrolled past the screen because email does not need to be opened as an excerpt or representation is normally enough to get the essence.

In an embodiment, the determination is also time/speed sensitive. In an embodiment, on the condition that an operator of an email client rapidly scrolls to the bottom of his inbox it might not count as read. But, on the condition that the operator scrolls slowly i.e. below a threshold, the messages are considered read.

In addition the invention detects when the operator has been in his inbox using another app. If the signaler circuit checks an inbox at time A and one of the following conditions is observed at time B, it determines the operator has been in the inbox: are there any new emails which have the read flag set; have any emails that used to be there been deleted; have any emails switched from read to unread or unread to read; have any emails been replied to; or have any emails been flagged or unflagged.

Figure 1:
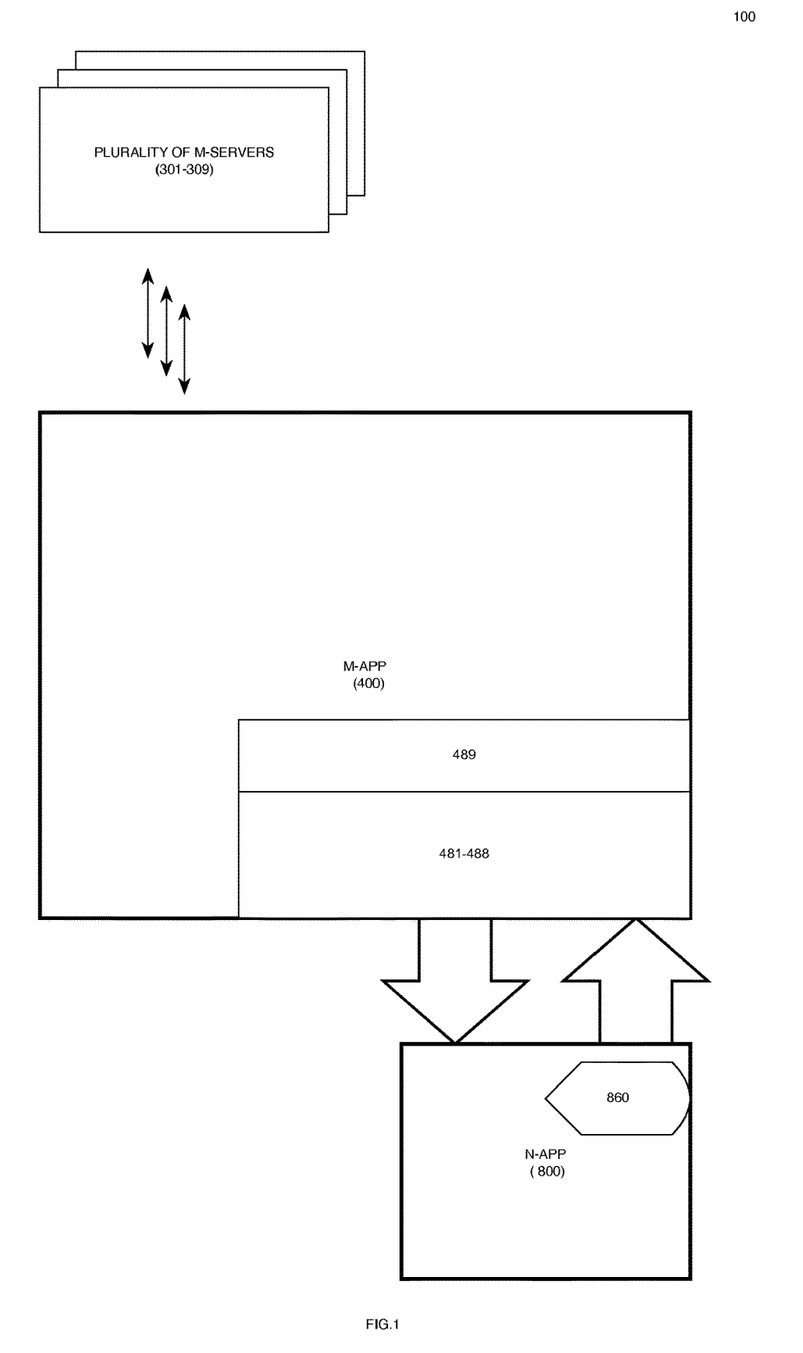
FIG. 1-3 are block diagrams of a system and its components.

Referring now to the figures, FIG. 1 shows a system 100 that includes a navigator apparatus 800 that has an instrumented viewport circuit 860 to display a proposed time-to-disposal (TTD) and a proposed disposition for each message; and, a transformer apparatus 400 that has a timer circuit 481-488 for each message in the viewport which causes a disposer circuit 489 to perform the proposed disposition when the time-to-disposal elapses after the message enters the viewport, the transformer coupled to the navigator and also coupled to at least one of a plurality of message servers 301-309.

Applicant's Message Transformation & Disposition Apparatus 400 (transformer) is coupled to Applicant's Precis Navigation and Viewport Control Apparatus 800 (navigator). The Transformer is also communicatively coupled to at least one of a plurality of message servers 301-309 using an interface circuit such as the OAuth framework or a plug-in.

Figure 2:
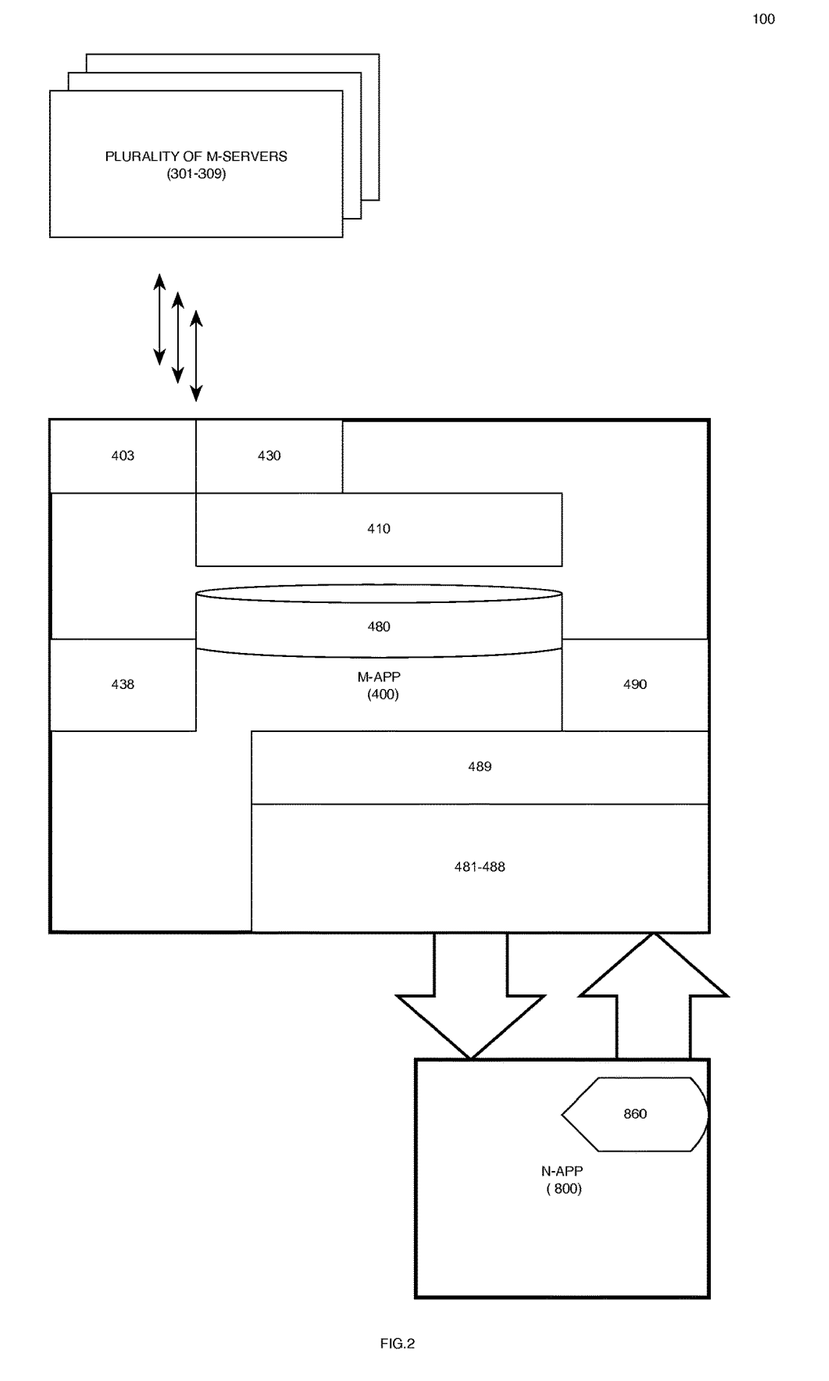

FIG. 2 shows an apparatus block diagram of transformer components. In an embodiment, the transformer 400 also includes an interface circuit 430 to retrieve a message body and headers from a message server; a disposition store 480 of recipient's previous message dispositions and each time-to-disposal (TIO); a predictor circuit 438 to propose a most likely disposition and most likely TTO by closest match of a retrieved message with a similar message in disposition store using content, sender id, ip address, or domain; and, a precis synthesizer circuit 410 to transform message body and headers and proposed no and disposition into a message precis.

In an embodiment, the transformer 400 also includes a disposition recorder 490 to write no and disposition into disposition store 480; and an interface circuit 403 to transmit a command to the message server to implement the disposition.

Figure 3:
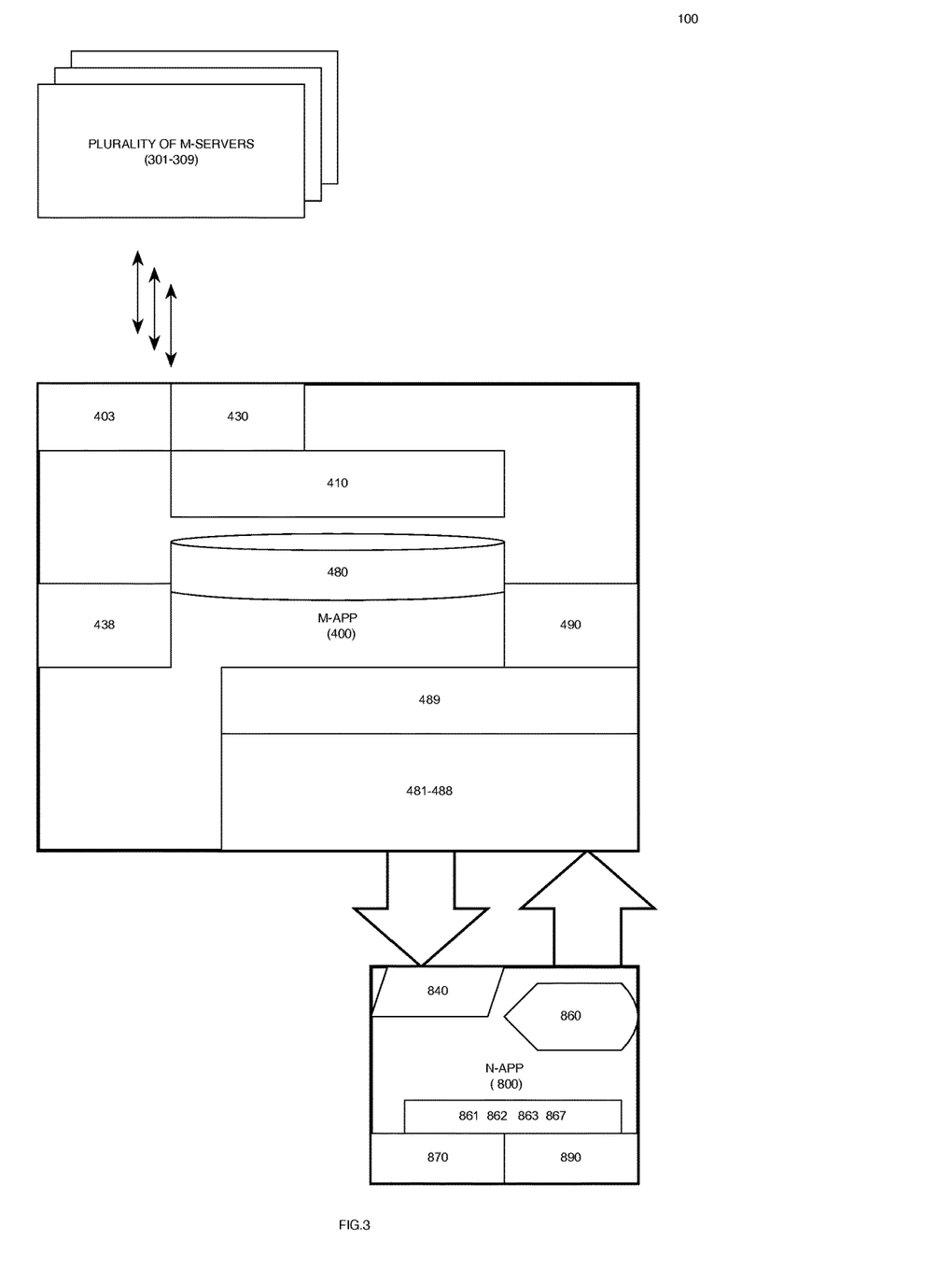

FIG. 3 shows an apparatus block diagram of navigator components. In an embodiment, the navigator 800 also includes a user interface 870 to receive commands to perform message dispositions including, but not limited to, archive, delete, forward, open, play, reply- to, and schedule that are recorded into disposition store and transmitted to the message server; and a circuit 890 to receive commands to amend a proposed disposition and to amend a proposed TTD; sensors 861-863 to determine a time when a message entered or exited the viewport, and a time when a message was disposed; a sensor to receive user's message disposition commands 867; and, a navigation control 840 to scroll or pan message precis through the viewport. In an embodiment, timers 481-488 are located within the navigator instead of the transformer (not shown).

Figure 4:
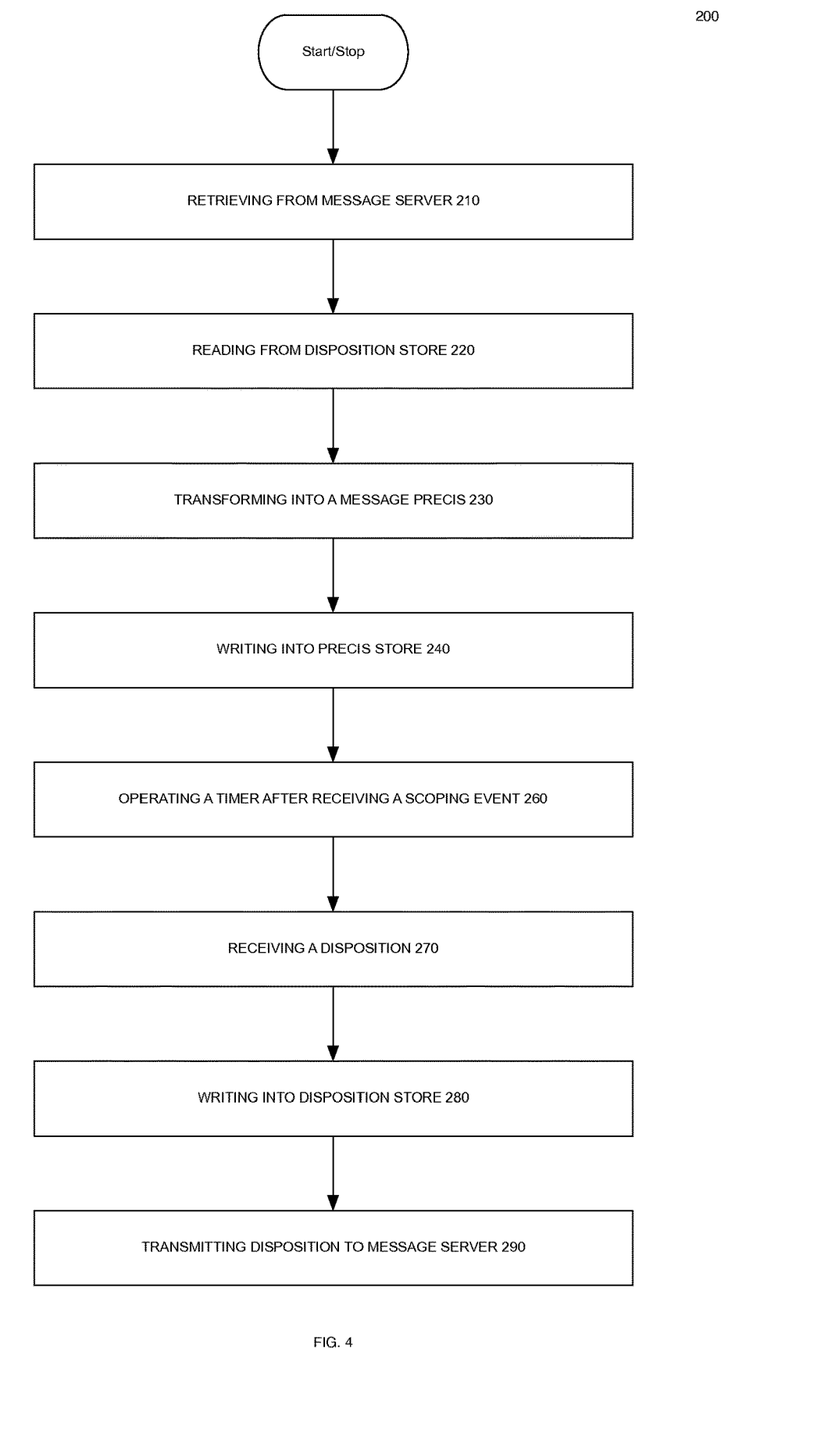
FIG. 4-5 are flowcharts of processes in each method of operation of the components of two apparatuses of the system.

Referring now to FIG. 4, Applicant discloses an exemplary embodiment of a process flowchart of performing method for operating a M-APP transformer apparatus, the method 200 comprising several processes:

Process 210 has steps for retrieving from message server, a message body and headers. In an embodiment, this also includes at least one of the following steps: identifying messages recently transmitted to sender id of the retrieved message; identifying messages recently transmitted on same subject of the retrieved message.

Process 220 has steps for reading from disposition store. This includes at least one of the following steps: identifying disposed messages with similar sender id, ip address, subject, meta data, message body content, or other characteristics; and, reading a stored time-to-disposal (TTD) and a disposition for the disposed messages similar to the retrieved message.

Process 230 has steps for transforming the stored disposition history and the received message body and headers into a message precis. This includes at least one of the following steps: transforming a message body into a soundbite, transforming a message body into a low resolution, reduced size image, transforming a message body into an image of a text fragment, determining closest match of retrieved message with similar message in disposition store, determining most likely TTD from closest message in disposition store, determining most likely disposition from closest message in disposition store, and synthesizing a message precis from TTD, disposition, message headers, and one of image and soundbite of message body.

Process 240 has steps for writing into an n-dimensional precis store. This includes at least one of the following steps: grouping messages with similar subjects, senders, or content types; ranking or prioritizing messages by TTD, calendar dates, actions requested, proposed disposition, size, how recently recipient transmitted a message to sender, storing message group, storing message rank/priority, storing message precis, storing proposed TTD and proposed disposition, and signaling the navigator when the writing is completed.

Process 260, which is optional but disclosed for completeness, has steps for operating a timer upon receiving a Scoping Event. This includes at least one of the following steps: receiving a signal that a message precis has entered a viewport for a non-trivial period, receiving a signal that a user has overridden a proposed TTD, receiving a signal that a user has overridden a proposed disposition, and receiving a signal that a user has selected a disposition action.

The process triggers operating a timer circuit after scoping by initializing a timer to a TTD, resetting a timer when user changes proposed TTD or proposed disposition, suspending/restarting upon a user intervention, and, triggering a proposed disposition when a timer expires.

Process 270 has steps for receiving a disposition. This includes at least one of the following steps: receiving a disposition command from the user, receiving a disposition command from a timer upon timer expiration, and causing a disposition circuit to perform the disposition.

Process 280 has steps for writing into disposition store. This includes at least one of the steps following: updating disposition store with actual TTD and actual disposition, removing disposed message from precis store, retraining disposition store for future predictions on similar messages, storing into disposition store date of disposition, sender id, ip-address, domain, subject, links in message body, message metadata, grouping, and message type; whereby the system is trained on recipient's preferences and policies to be applied to future retrieved messages.

Process 290 has steps for transmitting to a message server at least one command to perform a disposition. This includes but is not limited to at least one of: transmitting a command to archive a message, transmitting a command to forward a message, transmitting a command to reply-to a message, transmitting a command to delete a message, transmitting a command to another application to open a message, transmitting a command to another application to play a message, and, transmitting a command to another application to block a sender.

The process for operating the timers could be embodied remotely in each navigator or centralized into the transformer or could operated in both. Applicant describes both embodiments which can be optimized by implementation considerations.

Figure 5:
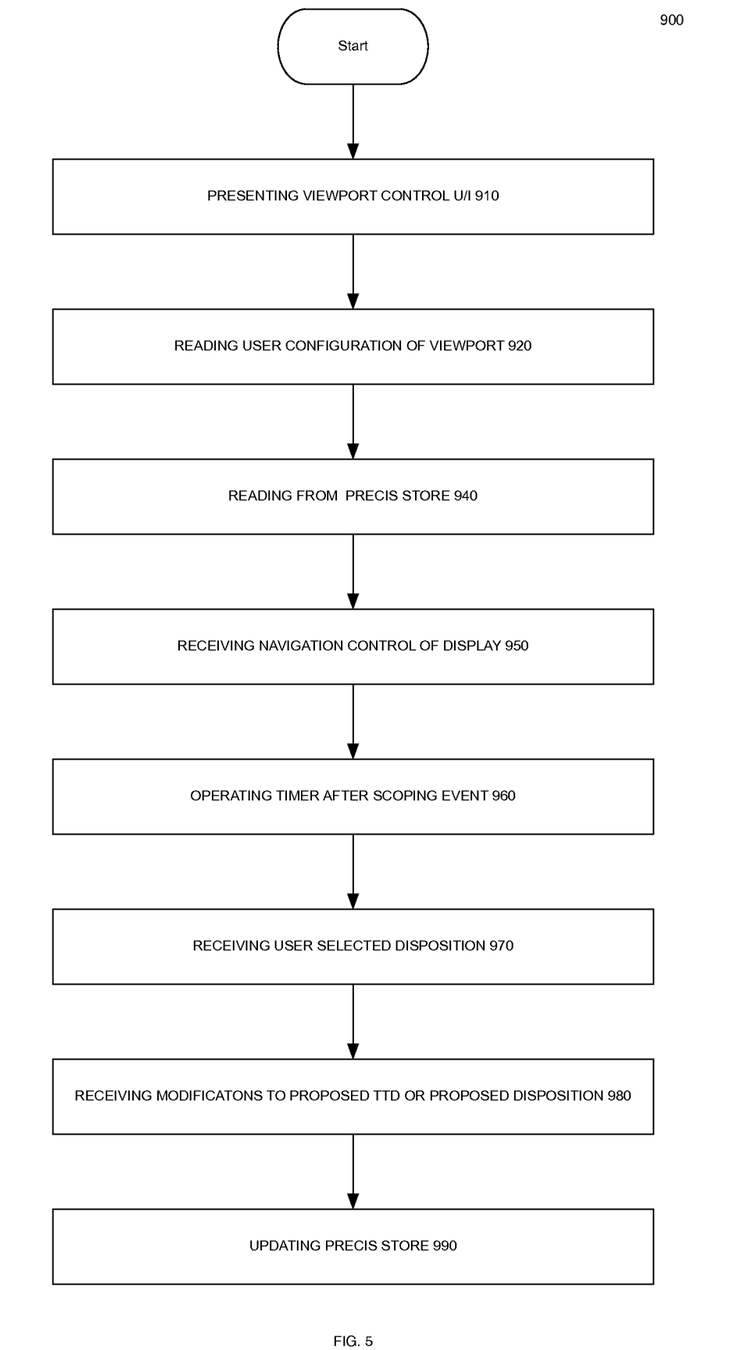

Referring now to FIG. 5, Applicant discloses an exemplary but non-limiting flowchart of processes performing a method for operating an N-APP navigator apparatus, the method 900 including the following processes:

Process 910 has steps for presenting a viewport control user interface. This includes displaying data entry widgets with defaults, receiving user inputs, and storing parameters.

Process 920 has steps for reading and implementing user configuration of a viewport. This includes configuring the viewport to appear as a list, a table, or another form of display. This includes setting a threshold for the minimum time a message must be within the viewport to be considered "entered" so that a fleeting glimpse as a user moves the viewport is not counted. An attention timer of the viewport may determine when a user has had enough attendance on a message to initiate a disposition timer. In an embodiment a 3D video camera of the apparatus determines that a user has had his head or his eyes arranged in a perceptive orientation.

Process 940 has steps for reading from precis store. This includes at least one of the following steps: receiving notification from a transformer that new message precis have been stored, reading message precises stored since the last time the message precis store was accessed, reading groups, ratings, proposed TTD, proposed disposition, and message headers and a representation of a message body, organizing the precises into a table, a list, or another format according to user configuration.

Process 950 has steps for receiving navigation commands which control the display of selectable precis in as instrumented viewport. This includes at least one of the following steps: receiving user commands to move precis into and out of scope because not all precis may be visible at once, displaying selectable precis in a viewport according to scrolling and panning controls received from a user, displaying precis in groups of similar messages if user has configured the viewport so, displaying precis in ranked order if user has indicated a preference.

A message precis navigation interface scrolls and or pans message precis into or out of an instrumented viewport. The instrumented viewport displays metadata for each message including the sender, date, subject, an editable proposed disposition, an editable proposed expiration time, and other information in graphic form. The method includes causing selected messages to be fully displayed upon command.

Process 960, portions of which are optional but disclosed for completeness, provides steps for operating a timer after determining a scoping event. This includes at least one of the following steps: receiving a signal that a message precis has entered a viewport for a non-trivial period, i.e. more than a threshold of time, receiving a signal that a user has overridden a proposed TTD, receiving a signal that a user has overridden a proposed disposition, receiving a signal that a user has selected a disposition action.

In an embodiment the navigator also comprises at least one timer. Upon determining that a message precis has entered a viewport (scoping), the process signals a timer either in the navigator itself or in the transformer.

The steps for operating a timer circuit after scoping includes: initializing a timer to a TTD, resetting a timer when user changes proposed TTD or proposed disposition, suspending/restarting upon a user intervention, and triggering a proposed disposition when a timer expires.

The navigator has an instrumented viewport which performs: sensing when a message precis enters the viewport; sensing when a message precis leaves the viewport, determining that a message and its proposed action, response, or trigger (ART) have entered scope when the user has had sufficient visibility in the viewport to observe the excerpt and proposed actions, initiating a time/day trigger circuit to begin a count down to launching the proposed action or response optionally at the navigator or at the transformer. A trigger may signal to an external process or cause a counter to increment or decrement with no immediate effect, or set a flag.

Process 970 has steps for receiving a user disposition. A user interface enables selection of one or more messages and then application of a disposition, proposed disposition, and proposed TTD to all selected messages or alternately, selection of a disposition, proposed disposition, and proposed TTD followed by flagging each message which is to be operated on. The steps include at least one of the following: sensing when a user disposes of a message, receiving deletion commands, signaling the transformer to transmit commands to the message server, storing a stack of commands for undo, receiving a disposition when a timer expires, and transmitting dispositions and changes to the transformer.

Process 980 has steps for user modifications to proposed TTD or proposed disposition. This includes at least one of the following steps: receiving a user override of a proposed TTD or a proposed disposition, receiving and executing timer reset commands, and transmitting to the transformer the updated TTD and proposed disposition.

Process 990 has steps for updating the precis store. This includes at least one of the following: writing into precis store a new proposed TTD, and new proposed disposition upon user intervention, and removing message precis from the store when deleted either actively by the user or passively when the timer expires, redisplaying the viewport with updated message precis.

Another aspect of the invention is a computer implemented method for automated custom transformation of and response to received electronic messages comprising: presentation of proposed actions, responses, and triggers (ART) for a message; observation of user intervention or acceptance of proposed ART; and machine learning from user intervention of more tightly tuned ART for message profile.

In an embodiment, the invention is a method which presents proposed actions, responses, and triggers (ART) for a message. It includes retrieving an electronic message from an inbox; determining a message profile according to characteristics of the message such as the sender name, personal and business address book, external links embedded in the message, content of the message, reviewing the user's personal history of mail sent or received, selecting from stored proposed actions, responses, and triggers the most likely choice for this message profile by applying heuristics, and displaying in a user viewport an excerpt of the message and the proposed ART.

In another embodiment, the invention is a method for observation of user intervention or acceptance of proposed ART performed by a processor: suspending and restarting the time/day trigger circuit when a user intervenes to reset the time/day, suspending the time/day trigger circuit when a user intervenes to perform an action different from the proposed action or response, and performing the proposed action or response when inaction by the user allows the time/day trigger circuit to launch.

In another embodiment, the method includes machine learning of more tightly tuned ART for message profile from user intervention in a viewport: for each presented message that a user does not accept a proposed ART, storing a new time/day trigger which might be a local time of day, day of week, or elapsed time from the message first entering scope, storing a new action, response, or disposition for a message to be launched upon fulfillment of the trigger, and associating at least one of the new trigger and ART with the profile of the message.

Another method for operation of a transformer includes the processes: generating a message precis by reading recipient's disposition store, retrieving message headers and metadata from a message server, and transforming a message body into a message precis. For each message, a disposition proposer circuit reads the most recent dispositions and times if a sender has a stored record in the disposition store and proposes a disposition and a time to execute the proposed disposition. A message precis is easily distinguished from conventional message metadata by inclusion of a proposed disposition, and a decay/expiration time. According to the message type, its precis also may have a soundbite of a voice or audio file, a thumbnail of an image, or an excerpt of a text message, or a logo/shape associated with a benefit. The method also includes storing the message precis into an N-dimensional array of categories and ranks. User controls will determine if these message precises are presented in a 1 dimensional list, a 2 dimensional table, or some other visualization. The method includes receiving navigation controls and delivering message precis to the navigator in the requested visualization. When a precis has been present within the viewport more than a threshold of time, a timer is started, either in the navigator or in the transformer or both. The process includes receiving user commands to stop or reset the time to a shorter or longer period. Unless the recipient operates on the message precis, the process includes performing proposed disposition upon completion of the timer.

A message disposition process includes storing one or more disposition actions and times for each sender and transmitting an equivalent command to a message server.

A method for operating a categorization circuit includes grouping messages by type, or by sender organization, or by subject matter or by message type. In an example, messages from family are grouped, messages relating to work are grouped, messages relating to finances are grouped, messages relating to hobbies or interests are grouped.

A method for operating a ranking circuit includes setting a priority for messages within each group. Messages with a proposed disposition of deletion are of lowest priority. Messages with long time to live have lower priority than messages with shorter time to live. Messages whose proposed disposition is to forward or reply have higher priority than messages whose proposed disposition is to archive.

The message transformation and disposition apparatus transforms a plurality of messages into precis that have TTD and proposed dispositions, groups, and ranks. The apparatus transforms minimal activity of the recipient into operations at the message server.

A recipient display and control apparatus transforms a collection of message precis into a selectable list or table. The apparatus transforms minimum activity on the part of the user into disposition commands and stores the dispositions for future replication.

In an embodiment, the transformer apparatus includes an interface to at least one message server, an interface to at least one navigator, a store of message dispositions and each time to disposition (TTD), a message transformer that generates precises, at least one timer for each message that enters an instrumented viewport, and a disposer that performs the proposed disposition when a timer expires.

In an embodiment, the message transformation and disposition apparatus (transformer) comprises an OAUTH interface circuit to access at least one message server. The transformer includes a command transmitter that sends to a message server such as but not limited to archive, retrieve, delete, forward, and reply. The transformer includes a plurality of timer circuits for each message precis and a timer control circuit that receives commands from the recipient display and control apparatus to start, stop, and reset any timer. A message disposition circuit implements a disposition command received from the recipient display and control apparatus or upon timer expiration a proposed disposition.

In an embodiment, the navigator apparatus includes a timer, an interface circuit to the transformer, an instrumented viewport, a viewport navigation control circuit, a message entry sensor, a message exit sensor, a user command sensor, a message disposition sensor, a circuit to read stored message dispositions and no, and a circuit to display a proposed disposition and TTD for each message within the viewport. A navigator circuit determines which precis are displayed. A timer signaling circuit transmits events to the message transformation and disposition apparatus when a message precis is within the viewport for a time greater than a threshold, when the message is selected or when the message is disposed. A message status circuit removes message precis from the store when deleted and signals the message transformation and disposition apparatus to transmit commands to the message server. A message control circuit causes messages to be fully displayed when selected, receives and performs deletion commands, receives and executes timer reset commands, and configures the viewport to appear as a list, a table, or an other form of display.

Another aspect of the invention provides an overlay triage service (which is accessible by wide area networking i.e. the cloud) that accesses a user's inbox at a mail server. The service transforms an email message by applying heuristic rules stored in non-transitory media to determine a potential treatment selected from a non-transitory media, customized to match the end user's history. An enduser viewport application (app) displays the transformed email message which contains a proposed treatment and a timer. The app determines when the enduser first places the transformed message in scope and starts the timer. If the enduser resets the timer, or performs a response to the message different from the proposed treatment, that new behavior is added to the enduser history. If the timer expires without enduser intervention, the proposed action is performed.

In an embodiment, an email client is coupled to a triage plugin which accesses the cloud overlay triage service to display the same proposed actions.

Another aspect of the invention is an adaptive user interface apparatus for accelerated message disposition, the apparatus comprising: an attendance and disposition recordation circuit (recorder); the recorder communicatively coupled to, a disposition timer circuit (timer), the timer communicatively coupled to, a scoping and selection determination circuit (scoper); the scoper, timer, and recorder all communicatively coupled to a navigation, selection, and disposition apparatus (navigator), wherein said navigator comprises a viewport, user controls to place a sub-range of an array of enhanced message metadata (enhanced precis) within the viewport, and sensors to determine when a particular enhanced precis is substantially within the viewport and when the user operates a selection mechanism on the particular enhanced precis; whereby, a proposed disposition within the enhanced precis is executed on a message by the recorder, after the timer determines a condition that a proposed disposition delay time within the enhanced precis has elapsed since the time the particular enhanced precis was first within the viewport, without a user operated selection.

In an embodiment, the apparatus also has an enhanced precis grouping and ranking circuit (grouper) to present a plurality of enhanced precis to the navigator as an n-dimensional array; the grouper coupled to the navigator by, a transceiver circuit (transceiver), the transceiver further coupled to the message attendance and disposition recordation circuit, whereby an enhanced precis which has been disposed is removed from the array, and a message in a message system is operated on when its respective enhanced precis is removed; and wherein, the grouper transforms a plurality of enhanced precis into an array of groups by similarities in the messages and transforms each group by ranks according to a proposed disposition delay time and a proposed disposition to be executed after expiration of the proposed disposition delay time by the timer.

In an embodiment the apparatus also has a past precis disposition profile circuit (profiler), the profiler communicatively coupled to the recorder, and to the grouper; the profiler including a proposed disposition updater circuit to receive, weight, and combine most recent dispositions for similar precis, a proposed disposition delay time updater circuit to receive weight, and combine most recent reaction times for similar precis, and a circuit to transform a precis into an enhanced precis by adding a proposed disposition and a proposed disposition delay time; whereby a user's most recent selections or dispositions of messages in the navigator influence a proposed disposition and proposed disposition delay time of a future similar message.

CONCLUSION

Thus it can be appreciated that the invention is distinguished by two major components. A message transformation and disposition apparatus (transformer) retrieves message metadata and body content from a message server to generate a message precis. A message precis is a transformation of metadata and the body content.

The second major component is a precis navigation and viewport control apparatus (navigator) that displays a selectable message precis and that enables message deletion, message moving, message forwarding, message flagging, and message opening. The navigator is most likely to be distributed and local to each user and measures the user's activity or inactivity, choices, and displays. The transformer might be remote and centralized or also local to the user.

At minimum the navigator provides an instrumented viewport and navigation control to sense when the message precis substantially enters the viewport, when the user opens a message, and when the user deletes a message. These operations trigger timers and operations at the message server or transformer. A fleeting glimpse of the precis while the viewport scrolls to the bottom does not trigger. The precis has to be within the viewport above a threshold of time to be "substantially" entering the viewport.

A more sophisticated version of the invention includes a message transformation and disposition apparatus (transformer) that retrieves message metadata and body content from a message server to generate a message precis, with recipient's disposition store that contains recipient's previous message dispositions and time-to-disposal (TTD).

The user may have considered this message or a similar message before. So, the prior disposition data is used by a circuit that upon receiving the message metadata, determines a proposed TTD and a proposed disposition when recipient has recently disposed a similar message.

A timer is initialized by the instrumented viewport to the proposed TTD and a circuit performs the proposed disposition when the timer matures.

The invention is easily distinguished by transforming a message into a precis which includes a thumbnail reduced size image derived from a video or a soundbite along with a proposed TTD and a proposed disposition.

The invention is easily distinguished by transforming a message into a precis which includes a text string excerpted from a message body along with a proposed TTD and a proposed disposition.

The beneficial objective of the present invention is to assist a user in traversing through non-malicious, well-meaning, but overwhelming volumes of messages by learning from the recipient's behaviors his or her preferences and applying rules which mimic the recipient's personal attitudes. The invention reduces a user's effort in scanning through messages. Action or inaction can be configured as default proposals from analyzing the characteristics and content of the message and the history between a sender and a recipient. From prior user mail handling behaviors, a circuit predicts a most likely recipient action on an incoming message. A presentation viewport presents the predicted/proposed action in a viewport along with a message precis.

In one embodiment, when a user views some portion of the message and the proposed action and does nothing more, the proposed action is scheduled. When the user chooses an action different from the predicted action in response to the message, the circuit develops a pattern to better match the characteristics of another message in a future disposition prediction. Continuous machine learning reduces the error rate in prediction and increases the percent of time the user views an incoming message and accepts the proposed action.

The apparatus is easily distinguished from conventional spam filtering by the display of a proposed action based on a user's treatment of similar messages or related messages which is applied when the user allows a timer to expire. The apparatus is easily distinguished from auto-reply because it suspends action until the recipient has an opportunity to override or customize the proposed response.

The techniques described herein can be implemented in digital electronic circuitry, or in computer hardware, firmware, software, or in combinations of them. The techniques can be implemented as a mobile device, i.e., firmware tangibly embodied in a non-transitory medium, e.g., in a machine-readable storage device, for execution by, or to control the operation of circuit apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and connected by a wireless network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices. The processor and the memory can be supplemented by, or incorporated in special purpose logic circuitry.

A number of embodiments of the invention have been described. Nevertheless, it will be understood that various modifications may be made without departing from the spirit and scope of the invention. For example, other network topologies may be used. Accordingly, other embodiments are within the scope of the following claims.

The invention claimed is:

1. An online message disposition system that comprises:
one or more message computing servers that store message data;
a disposition store that stores a plurality of historical messages of an operator of a message navigator;
a transformer processing circuit that is in operable communication with the one or more message computing servers and that:
retrieves one or more unread messages from the one or more message computing servers;
generates a proposed operation for the one or more unread messages based on identifying common attributes shared by the one or more unread messages and a subset of the stored plurality of historical messages of the operator, wherein the proposed operation comprises a dispositive action that is automatically executed upon an occurrence of a predetermined event;
determines the occurrence of the predetermined event;
in response to the determination of the occurrence of the predetermine event, automatically executes the proposed operation for the one or more unread messages; and
provides a command to the one or more message computing servers in accordance with the proposed operation.

2. The system of claim 1, wherein at the transformer processing circuit:
evaluating a content of the one or more unread messages; and
generating content score based on an identification of one or more key terms within the content, wherein generating the proposed operation for the one or more unread messages is further based on the generated content score.

3. The system of claim 1, further comprising:
a machine learning apparatus that:
    applies machine learning to the plurality of historical messages of the operator stored at the disposition store,
wherein generating the proposed operation for the one or more unread messages is further based on results of the application of machine learning to the plurality of historical messages of the operator.

4. The system of claim 1, wherein the proposed operation further comprises a predicted most likely action of the operator towards the one or more unread messages.

5. The system of claim 1, wherein the transformer processing circuit generates the proposed operation for the one or more unread messages by deriving one or more most likely actions of the operator towards the one or more unread messages.

6. The system of claim 1, wherein generating the proposed operation includes:
    identifying the subset of the one or more historical messages of the operator that have one or more common attributes,
    reading a stored disposition record of the subset of the one or more historical messages, and
    generating the proposed operation based on the stored disposition record of the subset of historical messages.

7. The system of claim 6, wherein reading the stored disposition record of the subset of historical messages includes identifying a frequency of messages, recency of messages, and quantity of messages from the sender.

8. The system of claim 1, further comprising:
a navigator graphical user interface that enables the operator to interact with messages from the one or more message computing servers, wherein the navigator graphical user interface comprises an instrumented viewport,
wherein the instrumented viewport displays defines a subsection of the navigator in which metadata of a selected unread message is displayed based on a selection of the unread message by the operator or a movement of the unread message into the instrumented viewport by the operator.

9. The system of claim 8, wherein the transformer processing circuit generates a message precis for each of the one or more unread messages, wherein the message precis comprises an excerpt of a content of one of the unread messages and data of the proposed operation.

10. The system of claim 9, wherein in response to selecting one of the one or more unread messages by the operator, automatically displaying the message precis comprising the excerpt of the content of the one unread messages and the data of the proposed operation within the instrumented view port.

11. The system of claim 1, wherein the predetermined event comprises user inactivity towards the unread messages;
in response to detecting the user inactivity towards the unread message, automatically executing the proposed operation.

12. The system of claim 8, wherein in response to displaying the message precis within the instrumented viewport, initializing a timer after the message precis has been displayed within the instrumented viewport in excess of a threshold.

13. The system of claim 1, wherein the predetermined event comprises an expiry of a timer;
in response to detecting the expiry of the timer, automatically executing the proposed operation.

14. The system of claim 13, wherein generating the proposed operation includes generating a proposed time-to-disposal (TTD) of the one or more unread messages,
the proposed TTD includes a proposed future time and future date for automatically executing the proposed operation, and
the timer is set according to the proposed TTD.

15. The system of claim 14, wherein wherein when a message precis is displayed within the instrumented viewport, the timer associated with the proposed TTD is adjustable by the operator by adjusting one or more of the future date and the future time of the proposed TTD for the one or more unread messages.

16. The system of claim 1, wherein wherein when a message precis is displayed within the instrumented viewport, the proposed operation for the one or more unread messages is adjustable by the operator to a different operation.

17. A computer-implemented method for online message disposition, the method comprising:
    retrieving one or more unread messages from the one or more message computing servers;
    using one or more computer processors to generate a proposed operation for the one or more unread messages based on identifying common attributes shared by the one or more unread messages and a subset of the stored plurality of historical messages of the operator, wherein the proposed operation comprises a dispositive action that is automatically executed upon an occurrence of a predetermined event;
    determining the occurrence of the predetermined event;
    in response to the determination of the occurrence of the predetermined event, automatically executing the proposed operation for the one or more unread messages; and
    providing a command to the one or more message computing servers in accordance with the executed proposed operation.

\* \* \* \* \*